TERMINAL CONSTRUCTION FOR ELECTRICAL CIRCUIT DEVICE

Filed June 26, 1968 2 Sheets-Sheet 1

INVENTOR.
ANTHONY L. J. ANDRASFAY
BY Ferd L. Mehlhoff,
ATTORNEY

TERMINAL CONSTRUCTION FOR ELECTRICAL CIRCUIT DEVICE

Filed June 26, 1968 2 Sheets-Sheet 2

INVENTOR.
ANTHONY L. J. ANDRASFAY
BY Gerd L. Mellhoff
ATTORNEY

United States Patent Office 3,529,120

Patented Sept. 15, 1970

3,529,120

TERMINAL CONSTRUCTION FOR ELECTRICAL CIRCUIT DEVICE

Anthony L. J. Andrasfay, Huntington Beach, Calif., assignor to Beckman Instruments, Inc., a corporation of California Filed June 26, 1968, Ser. No. 740,288
Int. Cl. H05k 1/10; 3/32
U.S. Cl. 219—107 5 Claims

ABSTRACT OF THE DISCLOSURE

An electrical assembly formed of a nonconductive base member adapted to receive and support a variety of electrical components on at least one surface thereof and including at least one terminal member mechanically attached to and protruding from the base member. The base member has a first hole formed therein which communicates with the surface of the base member and a second hold intersecting the first hole within the base member. The terminal member is provided with a first pin section and a second pin section positioned respectively in the first and second holes formed within the base member. The first pin section is upset or deformed within its hole to provide a positive mechanical interference fit between the sides of the pin section and the surface of the hole and the second pin section has its end thereof welded to the first pin section, the second pin section protruding outwardly from the base member for connecting the device into an external electrical circuit.

This invention is particularly applicable to electrical circuit devices such as electrical circuit boards microcircuit networks deposited on a ceramic or plastic wafer. The surface of the base member or wafer has deposited thereon an electrical network formed of an electrically conductive material and may also include various deposited or discrete components, such as capacitors, resistors and transistor devices which are electrically connected into the deposited electrical network. The device requires some terminal means for electrically connecting the electrical network into an external source of power or for electrically connecting a network with other apparatus.

In micromodule technology, various terminal arrangements have been employed in the past, such lead wires soldered to the deposited layer of material. Since the layer of material is, in most cases extremely thin it is difficult to obtain a good strong bond between the terminal member and the conductive layer. Various arrangements have been provided in the past for reinforcing the terminal member. One such arrangement consists of applying solder material to the point of connection of the terminal lead and the conductive layer, but this method is difficult to control and sometimes results in an overlapping of the adjacent conductive circuitry. Without a strong bond or mechanical attachment to the base, it is easy for the leads to become separated from the circuit element during handling and use thereof. One arrangement for producing extremely strong terminal members attached to a base member is disclosed in the patent application Ser. No. 712,230 filed Mar. 11, 1968, in the name of James R. Chesemore and a copending application Ser. No. 739,861, filed in the name of the present inventor. Both of the foregoing applications are assigned to Beckman Instruments, Inc., assignee of the present invention.

It is an object of the present invention to provide an improved terminal lead construction which is extremely strong and lends itself to automatic or automated manufacturing techniques.

Further objects and advantages of the invention will become apparent as the following description proceeds and the features of novelty which characterize the invention will be pointed out with particularity in the claims annexed to and forming a part of this specification.

For a better understanding of the invention, reference may be had to the accompanying drawings in which.

Figure 1:
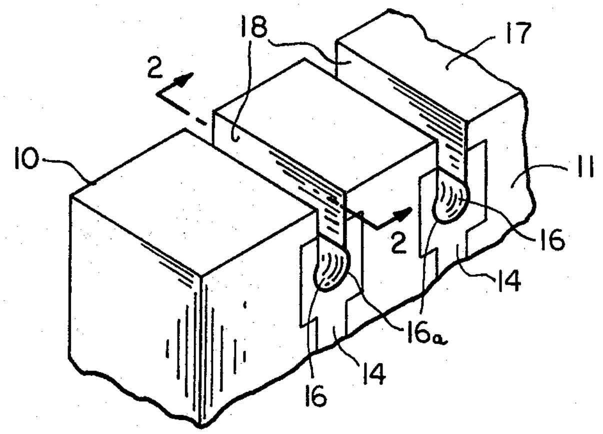
FIG. 1 is a partial perspective view of a nonconductive base member having openings formed therein in accordance with the present invention.
Figure 2:
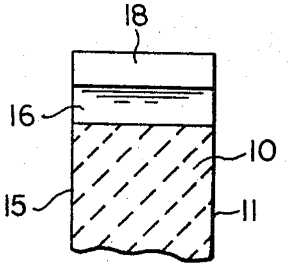
FIG. 2 is a cross-sectional view of the base member taken substantially along line 2—2 of FIG. 1.
Figures 3, 4:
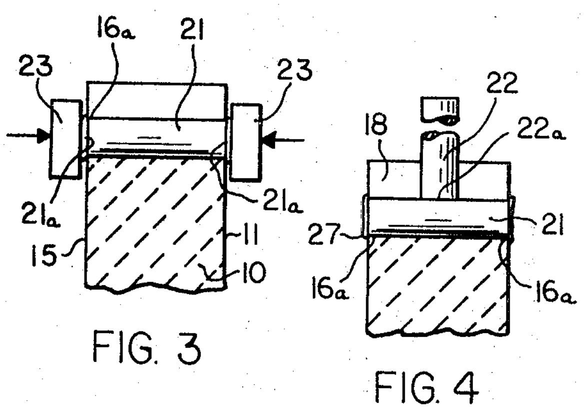
FIG. 3 is an enlarged cross-sectional view similar to that of FIG. 2, illustrating schematically the upsetting operation of a first pin section within an opening formed in the base member.
FIG. 4 is an enlarged cross-sectional view showing the assembly of the second pin section into abutting relation with the first pin section.
Figure 5:
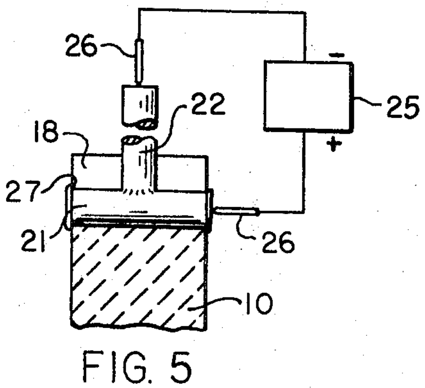
FIG. 5 is an enlarged cross-sectional view schematically illustrating the welding of the two pin sections of the terminal together.
Figure 7:
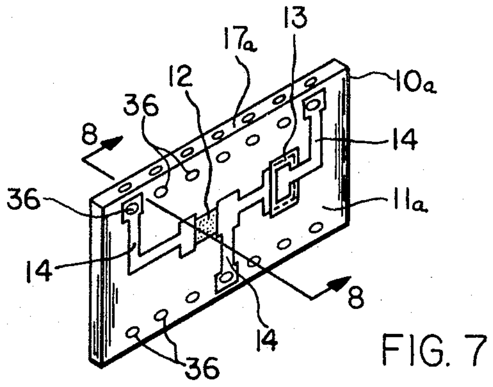
FIG. 7 is a perspective view of a microcircuit device including a base member having holes formed therein in accordance with a second embodiment of the invention.
Figure 8:
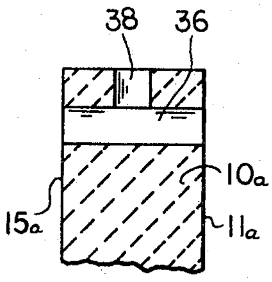
FIG. 8 is a cross-sectional view of a portion of the base member taken substantially along line 8—8 of FIG. 7.
Figure 9:
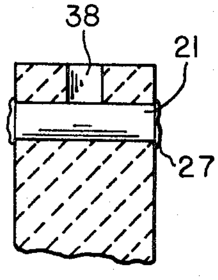
FIG. 9 is a cross-sectional view illustrating a first pin section upset within the first hole formed in the base member.
Figure 10:
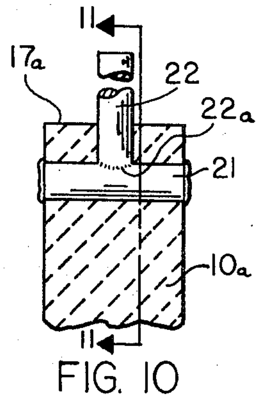
FIG. 10 is a cross-sectional view showing the two sections of the terminal pin welded within the holes formed in the base member.
Figure 11:
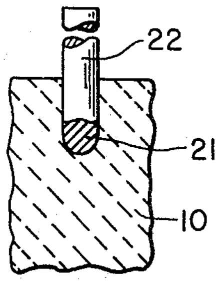
FIG. 11 is an enlarged cross-sectional view taken substantially along line 11—11 of FIG. 10.

Referring now to FIG. 1 there is shown an enlarged perspective view of a portion of a microcircuit element including a suitable nonconductive base member or substrate 10 in the form of a thin flat wafer having deposited on a flat surface 11 thereof a network of electrically conductive material 14, which is adapted to provide an electrical path connecting various electrical components attached to or formed in any desired arrangement on the base member. Such an arrangement of electrical components on a substrate base member 10*a* is shown in the embodiment of FIG. 7. As will be noted in FIG. 7 the conductive pattern or connectors 14 provide an electrical path for a resistor 12 and a capacitor 13 which are, in this embodiment of the invention, deposited on the surface 11*a* of the base member. The circuit elements, such as the resistor 12 and the capacitor 13, are merely exemplary of the type of electrical components that are commonly employed in microcircuit devices. It should be understood that other conductive electrical networks and elements, such as transistors and diodes may also be attached to the surface of the base member. The micromodule illustrated in FIG. 7 discloses only one embodiment of the microcircuit device and it will be understood that there is no intention to limit the invention to the particular circuitry disclosed. On the contrary, as will be hereinafter described, the terminal structure and method of assembly is broadly applicable to various types of microcircuit or other electrical devices regardless of the network pattern or the electrical components attached to the base member.

The substrate member may be formed of any suitable nonconductive material. In microcircuit devices, it is common to employ a high temperature resistant ceramic material, such as alumina, steatite, or other nonconductive material well-known in the art. In other devices it may be more desirable to use a base member formed of a nonconductive plastic material. As may be seen by reference to FIG. 1 and FIG. 7, the base member is provided with a plurality of holes formed therein. The first hole 16 (see FIG. 1) is formed transversely through the base member 11 with openings communicating with the surfaces 11 and 15. A second hole 18 which, in the embodiment of the invention disclosed in FIGS. 1–5, comprises a slot 18 along the edge 17 of the base member, intersects the first opening or hole 16 formed through the base member. In the embodiment disclosed in FIGS. 1–5, the slot or hole 18 communicates with opening 16 along its entire length within the base member.

It is preferably, in the arrangement disclosed in FIGS. 1–5, that hole 16 have a diameter somewhat greater than the width of the slot 18. As will be seen in FIGS. 1 and 5, portions of the conductive pattern 14 are deposited on the surface 11 adjacent the edges of the holes 16 and adjacent the edge of the slots or holes 18.

In order to provide a terminal for electrically connecting with the deposited connector 14, there is provided a terminal member which originally comprises two individual sections or segments that are assembled into the holes formed in the base member. As may be seen in FIG. 3, a first pin section 21 is inserted within the first slot 16 formed in the base member. The pin member 21 may preferably be formed of a wire strand or rod which may be rolled, extruded, stamped or otherwise fabricated of a conductive material such as copper, brass, or other conductive and malleable material.

The original length of pin section 21 is greater than the thickness of the base member 10 between the surfaces 11 and 15. After being inserted within the slot 16 of the base member, the pin section 21 is upset or otherwise deformed in place by an appropriate tool, such as the press or plates 23 schematically illustrated in FIG. 3, which apply a force against each end 21*a* of the first pin section. The pin section is made thicker or otherwise deformed in place by this upsetting operation so that the sides thereof expand against the sides of the slot 16 and produce a positive mechanical interference fit with the sides of the slot 16.

After the pin section 21 has been upset in place within the base member, a second pin section 22 is positioned within the second hole or slot 18 with one end 22*a* abutting against this surface of pin 21. While, in FIG. 4, pin 22 abuts against pin 21 approximately at the center thereof, it is obvious that the point of contact could be made any place along the length of pin 21.

After assembly of pin 22 within the hole or slot 18, it is heated and welded in place to connect the end 22*a* thereof with the pin 21 thereby forming an integral terminal member. Preferably this joining operation is performed by welding the two wire segments together. As may be seen in FIG. 5, a pair of electrodes 26 are attached to leads from a percussion arc welding apparatus, depicted by the reference numeral 25, and provide a source of electrical energy for percussion arc welding of the pin sections to each other. Obviously, other types of welding apparatus and other welding operations may be employed.

Figure 6:
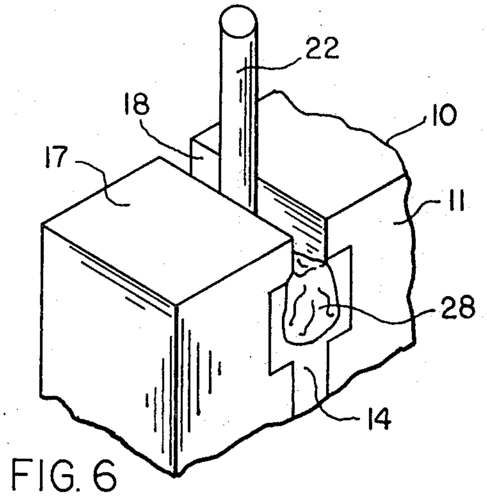
FIG. 6 is a perspective view showing the completed terminal and illustrating the use of an electrically conductive solder material for assuring an electrical connection to the conductive material on the base member.

In finished form, the terminal member appears as shown in FIG. 6. When the pin section 21 of the terminal member is upset within the slot 16, it substantially fills the voids therein and cannot be pulled out through the opening 18 or through the openings at the surfaces 11 and 15 of the base member. Also, the ends of the pin section 21 are preferably deformed or peened over the edges 16*a* (see FIG. 4) of the hole to form an overflow portion 27 which engages the deposited connector 14 making a good electrical connection therewith.

While it is preferable to have the pin section 21 of the terminal thickened or "upset" by the forces applied to opposite ends thereof, it is also possible to securely retain the pin section 21 within the slot by deforming it or causing it to bend within the slot or hole 16 so that the sides of the pin section engage with the sides of the slot and support the terminal member therein. Therefore, as used hereinafter in this specification and in the claims annexed hereto, the term "upset" is meant to apply to either or both of the structural changes wherein the pin section 21 of the terminal member is caused to become thickened within the slot or is so deformed within the slot that it engages the sides of the hole 16 and thereby becomes mechanically bound therein.

While the electrical connection between the end 21*a* of the upset pin section 21 and the conductive layer 14 is, in most instances, very good, it may also be desirable to employ other means for making an electrical connection between the first section 21 and the conductive layer 14. For example, it may be desirable to apply a solder coating or other electrically conductive coating over the upset end of the pin section. As may be seen in FIG. 6, solder coating 28 has been applied to the terminal region and overlaps the end of the pin section 21 as well as a portion of the deposited conductor 14. More of the solder material 28 has been deposited within the hole 18 over the pin 21 and further assures mechanical support of the terminal member within the holes formed in the base member. Arrangement of the pin 21 and pin 22 within the respective holes formed in the base member and the use of the solder material 28 provides an extremely sturdy support for the terminal and permits no movement of terminal member to break the electrical connection.

Referring now to FIGS. 7–13, there is shown another embodiment of the invention in which the substrate base member 10*a* is provided with a plurality of terminal mounting holes. These comprise a plurality of first holes 36 drilled or otherwise formed in the base member. As in the previous embodiment it is preferable to have the holes extend through the wafer 10*a* with openings formed in the opposite surfaces 11*a* and 15*a*. Each of the first holes 36 is intersected at some point within the confines of the base member 10*a* by a second hole 38 formed along the edge 17*a* of the substrate base member.

In order to form a terminal member, a first pin section 21 is inserted into the first hole 36. Similarly, as in the case of the first embodiment, pin section 21 is longer than the width of the base member 10*a*. As in the first embodiment of the invention, first pin section 21 is upset within the first hole 36 by a force applied against the opposite ends thereof. By deforming the pin 21 within the hole 36, it is caused to become thickened or so deformed that it engages with the sides of the hole 36 and produces a mechanical interference fit therewith. A second pin section 22 is then inserted through the hole 37 until it abuts against the surface of the first pin 21. The second pin 22 is then welded at its end 22*a* to the first pin 21, as may best be seen in FIGS. 10 and 11.

Figure 12:
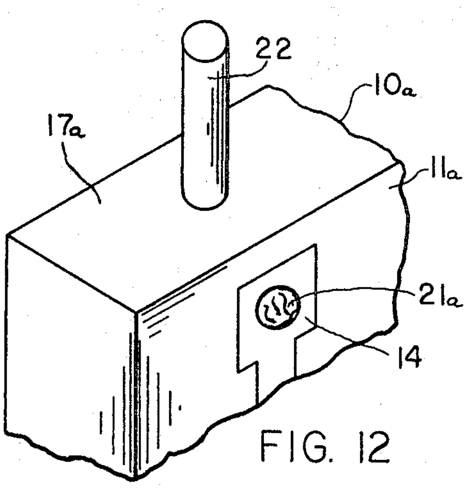
FIG. 12 is a perspective view illustrating the completed terminal pin positioned within a base member.
Figure 13:
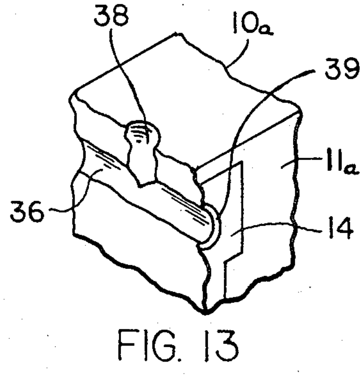
FIG. 13 is a perspective view illustrating a base member similar to that of FIG. 6 with the first hole through the base member having a chamfered edge portion at its juncture with the surface of the base member.

The completed terminal structure is shown in FIG. 12 with the second pin section 22 extending outwardly from the edge 17*a* and the end 21*a* of the first pin section deformed or "smashed" so that the overflow or peened over material makes good electrical contact with the deposited connector 14. If desirable, a solder or other conductive material (not shown in FIG. 12) may also be deposited over the end 21*a* of the pin section to assure good electrical contact with the surface of the conductor 14.

In some devices, it may not be desirable for the deformed or smashed end 21*a* of the pin to protrude above the surface of the base member. As may be seen in FIG. 13, it may be desirable to overcome this problem by providing a chamfered or relieved edge portion 39 around the openings to the first hole 36. In such a case the pin section 21 is then upset or deformed so that the overflow material 21*a* is forced into the beveled or chamfered edge portion 39 of the hole 36 and made flush with the surface of the base member 10*a*. Thus, the overflow material from the head section 21 spreads into the relieved portion 29 of the first hole 36 rather than forming a bulge in the region of the terminal pin. In such a case, the conductive material 14 is deposited so that a portion thereof becomes bonded to the chamfered edge 39 of the hole and, when the pin section 21 is upset within the hole, the ends of the pin are deformed against electrically conductive material 14 deposited therein. The surface 11*a* of the base member 10*a* and the upper surface of the upset pin 21*a* are substantially flush.

While in accordance with the patent statutes there have been described what at present are considered to be the preferred embodiments of the invention, it will be obvious to those skilled in the art that various changes and modifications may be made therein without departing from the invention and it is, therefore, the aim of the appended claims to cover all such changes and modifications as fall within the true spirit and scope of the invention.

What is claimed is:

1. The method of making a circuit element comprising the steps of:

providing a nonconductive base member having a surface adapted to support electrical components thereon;

forming a first hole through said base member, said hole having an opening on said surface adapted to support said electrical components;

forming a second hole in an edge of said base member, said second hole intersecting said first hole within said base member;

depositing a layer of conductive material on said surface of said base member in a pattern forming electrical connectors between said electrical components adapted to be supported on said base member, at least one of said electrical connectors being deposited adjacent an edge of said opening to said first hole formed in said base member;

inserting a first pin section into said first hole formed in said base member;

applying a compressive force to said first pin section to upset said first pin section thereby producing a positive mechanical interference fit between said first pin section and the sides of said hole to support said first pin section within said hole;

then positioning a second pin section within said second hole in said base member with a portion thereof abutting against said first pin section and one end thereof extending from said base member; and supplying electrical energy to said first and second pin sections to heat said pin sections and weld abutting portions of said pin sections to each other.

2. The method defined in claim 1 in which said second hole is formed by the step of forming a slot along the edge of said base member, said slot intersecting said first hole along the length thereof within said base member.

3. The method defined in claim 1 including the step of applying a solder material over at least a portion of said upset first pin section and over said electrical connector adjacent said first hole to provide an electrical connection between said first pin section and said electrical connector.

4. The method defined in claim 1 including the step of forming a relieved region at the opening of said first hole in the surface of said base member, and upsetting said first pin so that the end thereof is deformed within the relieved region of said first hole and the end of said first pin is flush with the surface of said base member.

5. The method defined in claim 1 including the steps of forming a chamfer around the opening to said first hole and the surface of said base member, depositing said conductive material in said chamfer and deforming the end of said first pin to make good electrical contact with said conductive material deposited on said chamfer.

References Cited

UNITED STATES PATENTS 3,443,160 5/1969 Salera.

DARRELL L. CLAY, Primary Examiner

U.S. Cl. X.R.

29—626; 174—68.5; 317—101; 339—17, 220